April 26, 1966     T. P. FARKAS ET AL     3,248,608
GENERATOR PROTECTIVE DEVICE
Filed March 15, 1961     3 Sheets-Sheet 1

Fig.1

INVENTORS
Thomas P. Farkas
Richard J. Coburn
BY
McCormick, Paulding & Huber ATTORNEYS April 26, 1966 T. P. FARKAS ET AL 3,248,608
GENERATOR PROTECTIVE DEVICE
Filed March 15, 1961 3 Sheets-Sheet 2

Fig. 2

INVENTORS:
THOMAS P. FARKAS
RICHARD J. COBURN
BY Teller, McCormick, Paulding & Huber
ATTORNEYS April 26, 1966     T. P. FARKAS ET AL     3,248,608

GENERATOR PROTECTIVE DEVICE

Filed March 15, 1961     3 Sheets-Sheet 3

INVENTORS
Thomas P. Farkas
Richard J. Coburn

BY
McCormick, Paulding & Huber ATTORNEYS

United States Patent Office 3,248,608
Patented Apr. 26, 1966

3,248,608
GENERATOR PROTECTIVE DEVICE
Thomas P. Farkas and Richard J. Coburn, Bloomfield, Conn., assignors to Dynamic Controls Corporation, East Hartford, Conn., a corporation of Connecticut
Filed Mar. 15, 1961, Ser. No. 95,910
26 Claims. (Cl. 317—13)

This invention relates to a protective device or apparatus usable with an electrical generator to protect the generator and/or an electrical load connected with the generator from the effects of generator malfunction.

It is the general object of the invention to provide an improved automatically operable protective device which monitors the output of a generator and which shuts down the generator and/or disconnects the generator from its load responsive to overvoltage, undervoltage, and underfrequency conditions.

The drawing shows two embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

GENERAL ORGANIZATION

The protective device of the present invention is usable with a variety of generator and load types, but is particularly adapted, in the embodiments shown, for use in aircraft with polyphase alternating current generators and with electrical loads of the type found in aircraft. In the drawing, three lead conductors 10, 12 and 14 are shown, as from a three phase alternating current aircraft generator. The lead conductors 10, 12 and 14 extend to a load not shown and respectively include switches or switch means 16, 18 and 20. The switches or switch means 16, 18 and 20 may obviously be closed and opened respectively to connect and disconnect the generator and the load. In accordance with the presently preferred practice, said switches are closed by operation of the protective device of the invention when the generator output voltage and/or frequency reaches a predetermined minimum level and, also by operation of the protective device, the said switches are opened when overvoltage, undervoltage, and/or underfrequency conditions occur. Thus, detrimental effects of such conditions on the load are avoided.

There are also provided three secondary or branch lead conductors 22, 24 and 26 and said secondary or branch lead conductors are connected respectively with the lead conductors 10, 12 and 14. At least one of the secondary or branch lead conductors 22, 24 and 26 is connected with the protective device of the invention as will be seen to provide voltage and frequency signals which are monitored by said device. In the embodiments of the invention shown, the highest and lowest of the lead conductor voltages are automatically selected and monitored by the protective device but it will be obvious that various other generator output voltages can be monitored without departing from the invention. For example, an average generator output voltage or a single output voltage imposed on a selected lead conductor may be employed. Accordingly, the phrase "a generator output voltage" is to be given its broad meaning herein and in the claims which follow and should be taken as including any voltage signal conveniently derived from a single or polyphase generator output and usable for control purposes.

Also connected with the protective device of the invention is a direct current supply conductor 28. Said conductor is connected with a direct current power source, not shown, which make take various forms. In an aircraft installation the conductor 28 may be connected selectively with a battery or batteries and a rectified and regulated generator output voltage by means of automatically operable switching means. A switch or switch means 30 in the conductor 28 may be manually operable and, as will be seen, said switch serves on closing and opening movements respectively to render the entire protective device of the invention operative and inoperative. As will also be seen hereinafter, the switch 30 fulfills a reset function when a shutoff operation of the protective device occurs to protect the generator and/or the load from detrimental effects of generator malfunction.

A final exterior connection with the protective device of the invention involves a pair of conductors 32 and 34 which extend respectively to contacts 36 and 38 adapted to be opened and closed by movement of a switch member 40. The conductors 32 and 34 are connected in circuit with the field circuit of the generator associated with the protective device in such manner that opening and closing of the contacts 36 and 38 will serve to open and close the field circuit. In accordance with the presently preferred practice, the protective device of the invention serves to open the contacts 36, 38 as well as to open the load switches 16, 18 and 20 when overvoltage, undervoltage, and/or underfrequency generator output conditions occur. Thus, shutoff operation of the protective device involves shutdown of the generator as well as disconnection of the generator and its load.

As will be described more fully hereinafter, the protective device proper includes a shutoff relay indicated generally at 42 and overvoltage, undervoltage and starting, and underfrequency circuits all operatively connected with said shutoff relay and with the aforementioned secondary or branch lead conductors 22, 24 and 26. Also included in the device is a switching transistor or second amplifier means 44. Said means is adapted to effect shutoff operation of the relay 42 responsive to a predetermined signal voltage and each of the aforesaid circuits operates through said means to effect shutoff operation of said relay. As previously mentioned, the shutoff operation involves opening of the contacts 36, 38 and opening of the load switches 16, 18 and 20 and such shutoff operation is effected by the relay 42 shown. It is to be understood, however, that the relay 42 can be readily adapted to effect other modes of shutoff operation and such adaptation falls within the scope of the invention.

Generally speaking, the overvoltage circuit is connected with each of the branch lead conductors 22, 24 and 26 and with the amplifier means 44 and is operable to provide a signal voltage for operating said means when the highest of the lead conductor voltages exceeds a predetermined maximum level or limit. The undervoltage and starting circuit is also connected with each of the branch lead conductors 22, 24 and 26 and with the amplifier means 44. In the preferred embodiment of the invention, said undervoltage and starting circuit activates or renders the protective device operative when the lowest of the lead conductor voltages exceeds a predetermined minimum limit or level and said circuit also serves to provide a signal voltage for operating said amplifier means 44 when the said lowest of the lead conductor voltages thereafter decreases below said predetermined minimum level or below a second predetermined minimum level. In an alternative form of the invention, the undervoltage and starting circuit activates or renders the protective device operative when both the aforesaid lowest lead conductor voltage and the generator output frequency exceed predetermined minimum levels or limits. Said circuit also serves to provide a signal voltage for operating the amplifier means 44 when the lowest lead conductor voltage decreases below said predetermined minimum level or below a second predetermined minimum level and/or when the generator output frequency decreases below its predetermined minimum level. The underfrequency circuit is connected with one of said branch lead conductors 22, 24 and 26. In the preferred embodiment of the invention, said circuit directly provides a signal voltage for operating said amplifier means 44 when the lowest lead conductor voltage exceeds its said predetermined minimum level and when the generator output frequency thereafter decreases below its predetermined minimum level. In the alternative form of the invention, the underfrequency circuit operates indirectly with respect to the amplifier means 44 and causes the undervoltage and starting circuit to provide a signal voltage for operating said means when the lowest lead conductor voltage and the frequency first exceed their predetermined minimum levels and when the generator output frequency thereafter decreases below its predetermined minimum level.

*Undervoltage and starting circuit*

A first portion of the presently preferred undervoltage and starting circuit comprises a selector and comparison circuit indicated generally at 46. Said circuit is connected with each of the secondary or branch lead conductors 22, 24 and 26 and operates to provide a direct current signal voltage which is variable with the lowest of the lead conductor voltages. Said direct current signal voltage is provided at an output junction 48 of the selector and comparison circuit and, as will be seen, said signal voltage serves to operate a first amplifier or starting transistor means indicated generally at 50.

As shown, the selector and comparison circuit 46 comprises first, second and third conductors 52, 54 and 56 which are respectively connected with the secondary or branch lead conductors 26, 24 and 22. First, second and third rectifiers or rectifying means 58, 60 and 62 are disposed respectively in the conductors 52, 54 and 56 to provide positive direct current voltages proportional to the lead conductor voltages. Preferably, and as shown, a filter means is provided in association with each of the rectifiers or rectifying means 58, 60 and 62. Said filter means comprises ground connected capacitors 64, 66 and 68.

First, second and third resistance bridges or bridge means are also included in the selector and comparison circuit 46. A first resistance bridge or bridge means comprises a variable resistor 70 and a fixed resistor 72 connected in the conductor 52. A second resistance bridge or bridge means comprises a variable resistor 74 and a fixed resistor 76 connected in the conductor 54. A third resistance bridge or bridge means comprises a variable resistor 78 and a fixed resistor 80 connected in the conductor 56. Each of said three resistance bridges or bridge means has one side connected to the rectifier or rectifying means in its associated conductor and an opposite side connected to a reference voltage supply means to be described presently.

The reference voltage supply means includes a conductor 82 which provides a substantially constant direct current reference voltage for each of the resistance bridges or bridge means. The conductor 82 is connected with a gas tube 84 which serves a voltage regulation function and which is supplied by a voltage doubler circuit indicated generally at 86. The arrangement and operation of the gas tube 84 and the voltage doubler circuit 86 are or may be conventional and need not be described in detail. It is to be noted however that a dual power source for the voltage doubler circuit is provided for reliability of operation. Each of the secondary or branch lead conductors 24 and 26 are connected with said circuit so as to supply electrical power thereto.

From the foregoing it will be apparent that voltages at the mid-points or comparison junctions 88, 90 and 92 of the three resistance bridges will be proportional respectively to the generator output voltages of the three secondary or branch lead conductors 26, 24 and 22. The junctions 88, 90 and 92 are connected with the output junction 48 of the selector and comparison circuit respectively through rectifiers 94, 96 and 98. In addition, said output junction 48 is connected with a high voltage direct current power source by means of a conductor 100. The conductor 100 includes a dropping resistor 102 and extends to a junction 104. First, second and third conductors 106, 108 and 110 connected with the conductor 100 are respectively connected with the lead conductors 26, 24 and 22 and respectively include rectifying means or rectifiers 112, 114 and 116. Thus, a direct current voltage proportional to the highest of the lead conductor voltages is provided at the junction 104 and serves as a high voltage direct current supply for the output junction 48 of the selector and comparison circuit.

From the foregoing it will be apparent that the rectifiers 94, 96 and 98 may be so oriented or arranged that current will flow therethrough to reduce the signal voltage at the output junction 48 to the level of the lowest of the comparison voltages at the junctions 88, 90 and 92. Thus, the selector and comparison circuit operates as stated to produce a signal voltage proportional to the lowest of the lead conductor voltages.

The aforementioned first amplifier means or starting transistor means 50 comprises a transistor having its base terminal 118 connected with the output junction 48 of the selector and comparison circuit 46 by a conductor 120. The collector terminal 121 of the transistor 50 is connected with a coil 122 of a sensitive secondary starting relay 124 and thence to the aforementioned conductor 28 by means of a connecting conductor 126. The emitter terminal 128 of the starting transistor or amplifier means 50 has a conductor 130 extending therefrom to a ground connection 132. Thus, it will be seen that the starting transistor 50 can be operated or rendered conductive to energize the relay coil 122 responsive to a signal voltage at the output junction 48 of the selector and comparison circuit 46. With the aforementioned switch 30 in the conductor 28 in a closed position, the starting transistor 50 will become conductive to energize said coil when the said signal voltage reaches or exceeds a predetermined level. Obviously, said predetermined level can be adjusted so that the starting transistor 50 will operate to energize the coil 122 when the lowest lead conductor voltage reaches or exceeds a desired predetermined minimum level.

The provision of the secondary starting relay 124 is optional but is presently preferred. As shown, the said relay serves to operate a primary starting relay 134 and a load switch relay 136. A normally open switch member 138 in the relay 124 closes contacts 140, 142 in a conductor 144 when the coil 122 of the relay is energized by the operation of the starting transistor 50. A coil 146 of the load switch relay 136 is connected with the conductor 144 in a conductor 148 which extends to the aforementioned shutoff relay 42. The said shutoff relay includes a switch member 150 which serves to close contacts 152 and 154 to connect the conductor 148 to ground at 156 during normal generator operation. Thus, closing of the switch member 138 serves to complete a circuit for energizing the load switch relay coil 146 through conductors 28, 126, 144, 148, and through switch contacts 140, 142, 152, 154, and switch member 150. Energization of the load switch relay coil 146 results in closing movements of the normally open load switches 16, 18 and 20 mentioned previously.

The conductor 144 also extends to a coil 158 of the primary starting relay 134 and thence to the conductor 148 for connection to ground at 156 through the shutoff relay 42. Thus, operation of the secondary starting relay 124 also results in energization of the coil 158 of the starting relay 134, a circuit being completed through the conductors 28, 126, 144 and 148 and through the contacts 140, 142, 152 and 154 and the switch members 138 and 150. Energization of the coil 158 of the starting relay 134 on operation of the starting transistor 50 and the secondary starting relay 124 activates or renders the entire protective device operative as will be described presently.

A first switch member 160 in the starting relay 134 selectively opens and closes contacts 162 and 164 in a conductor 166 connected in the conductor 120 in parallel with a resistor 168. Said first switch member 160 closes the contacts 162 and 164 on energization of the relay coil 158 to shunt the resistor 168 and to thereby provide a dead band in the operation of the starting transistor 50, the secondary starting relay 124, and the primary starting relay 134. That is, when the starting transistor 50 has been operated or rendered conductive by a signal voltage of a predetermined level at the junction 48 and the base terminal 118, said transistor will not thereafter become inoperative or nonconductive until the signal voltage drops to a level substantially below its original level. Removal of the resistor 168 from the circuit by closing of the switch member 160 provides for operation of the starting transistor 50 at a first predetermined signal voltage level and for an inoperative condition of said transistor at a second and lower predetermined voltage level. Said signal voltage levels of course correspond to first and second predetermined minimum levels or limits of the lowest lead conductor voltage.

A second switch member 168 in the starting relay 134 normally resides in an upper position as shown wherein it closes contacts 170 and 172. On energization of the relay coil 158, the switch member 168 is urged to a lower position wherein it opens the contacts 170 and 172 and closes contacts 174 and 172. The common contact 172 is connected with a conductor 176 containing a resistor 178 and a capacitor 180 locally grounded at 182. The contact 170 is connected to a conductor 184 which is in turn connected with a conductor 186 extending to the base terminal 188 of a first transistor included in the switching transistor means or second amplifier means 44. The contact 174 is connected to a conductor 190 which extends to a junction 192 with the aforementioned conductor 28.

As will be explained fully hereinbelow, the application of a predetermined signal voltage to the base terminal 188 of the first transistor of the amplifier or switching transistor means 44 results in operation of said first transistor and in shutoff operation of the relay 42. Shutoff operation of said relay 42 involves opening of the aforementioned contacts 36 and 38 in the generator field circuit and opening of the contacts 152 and 154 breaking the ground connection of the conductor 148. Loss of the ground connection 156 for the conductor 148 results in de-energization of the coil 146 of the load switch relay 136 serving to open the load switches 16, 18 and 20 and in de-energization of the coil 158 of the starting relay 134 rendering the protective device inoperative. The manner in which a signal voltage is applied to the base terminal 188 to initiate such a sequence of operations responsive to an undervoltage condition will now be described.

When the lowest lead conductor voltage reaches a level causing the starting transistor 50 to operate and to operate the starting relays 124 and 134, the switch member 168 is moved to its lower position to close the contacts 174 and 172. The capacitor 180 is thereupon charged by connection with the source of direct current power through the conductors 176, 190 and 28, the contacts 172 and 174, and the said switch member 168. Subsequent reduction of the lowest lead conductor voltage to its second predetermined minimum level causes the starting transistor 50 to become inoperative or nonconductive and to de-energize the coils 122 and 158 of the relays 124 and 134. The switch member 168 thereupon moves to its upper position opening the contacts 172 and 174 and closing the contacts 172 and 170. On closing of the contacts 172 and 170, the capacitor 180 discharges through the conductors 176, 184 and 186 and the contacts 170 and 172, and the switch member 168 to apply a predetermined signal or operating voltage to the base terminal 188 of the first transistor of the switching transistor means 44.

Preferably, and as shown, the undervoltage and starting circuit also includes a time delay device operable to prevent shutoff operation of the protective device for instantaneous undervoltage conditions. In preferred form, said device comprises a capacitor 194 connected in a conductor 196 which extends from the conductor 120 to a contact 198 in the starting relay 134. A conductor 200 connected with an adjacent contact 202 in the relay 134 extends to the collector terminal 121 of the starting transistor 50. When the relay coil 158 is energized in a starting operation, a switch member 204 is moved to a lower position to close the contacts 198 and 202 and to thereby connect the conductors 196 and 200. The capacitor 194 is thereupon charged by connection with the direct current power source through the conductors 196, 200, 126 and 128, the contacts 198, 202, the switch members 204 and 30, and the relay coil 122. Subsequently, the capacitor 194 discharges to the base terminal 118 of the starting transistor 50 to maintain operation of the same whenever the signal voltage at the output junction 48 of the selector and comparison circuit instantaneously decreases below its said second predetermined minimum level or limit. Obviously, sustained reductions in the signal voltage at the junction 48 will render the starting transistor 50 inoperative and shutoff operation will occur in the manner described above.

Preferably there is also provided a limiting means comprising a rectifier 206 in the conductor 120. Said limiting means or rectifier serves to limit the rate of discharge of the capacitor 194 and renders the time delay period approximately independent of the magnitude of an instantaneous reduction in the signal voltage at the junction 48. That is, a minimum time delay period is provided irrespective of the magnitude of such instantaneous reductions in the signal voltage. Conduction in a reverse direction through the rectifier 206 is prevented and excessively high rates of discharge of the capacitor 194 are thereby prevented.

A final function of the starting relay 134, in the preferred embodiment of the invention, involves arming of the underfrequency circuit of the protective device. A switch member 208 in the relay 134 is operable to open and close contacts 210 and 212 in a conductor 214. The conductor 214 includes a resistor 216 and extends to a ground connection at 218. In addition, the said conductor extends to the underfrequency circuit of the generator protective device and renders said circuit inoperative when its ground connection 218 is completed. When the coil 158 of the relay 134 is energized, it moves the switch member 208 to open contacts 210 and 212 to disconnect the conductor 214 from its ground connection 218 and to thereby activate or render the underfrequency circuit operative.

*Overvoltage circuit*

The presently preferred overvoltage circuit includes the aforementioned conductors 106, 108, 110, the rectifiers 112, 114 and 116, and the condutcor 100 and the junction 104. As previously mentioned, a direct current voltage variable with the highest of the lead conductor voltages will occur at the junction 104. A conductor 220 connected with the junction 104 extends to the aforementioned conductor 186 and preferably has a filter means associated therewith. Said filter means may comprise a ground connected capacitor 222. A variable resistor 224 in the conductor 220 constitutes one element of a resistance bridge or bridge means which also includes a fixed resistor 226 in a conductor 228. The conductor 228 is connected with the aforementioned reference voltage supply means comprising the tube 84 and the doubler circuit 86 by means of the conductor 82 and also joins the conductor 220 at a junction 230. The junction 230 constitutes an output junction for the overvoltage circuit.

From the foregoing it will be apparent that adjustments can be made to provide for a predetermined signal voltage at the junction 230 for operating the switching transistor means 44 when the highest lead conductor voltage reaches or exceeds a predetermined maximum level or limit. Thus, shutoff operation of the protective device resulting from operation of the relay 42 can be provided for responsive to an excessively or undesirably high generator output voltage.

Preferably, and as shown, a time delay means is provided for preventing shutoff operation responsive to instantaneous high voltage conditions. Said device comprises a capacitor 232 connected to ground at 234 through a resistor 236 and connected to the conductor 220 at a junction 238. Instantaneous high signal voltages occurring at the junction 230 are shunted to ground through the capacitor 232 and the resistor 236 so as not to effect operation of the switching transistor means 44. Sustained high signal voltages, however, are applied at the base terminal 188 of the first transistor of the switching transistor means 44 from the junction 230. Such signal voltages effect operation of said switching transistor means and consequent shutoff operation of the relay 42.

Switching transistor means and shutoff relay

In the presently preferred form, the second amplifier means or switching transistor means 44 comprises first and second transistors connected in tandem or back-to-back relationship. The first transistor has a base terminal 188 as mentioned, a collector terminal 240, an emitter terminal 242 and the second transistor has a base termianl 244, a collector terminal 246 and an emitter terminal 248. The collector terminals 240 and 246 of said two transistors are connected in common with the aforementioned conductor 28 through a resistor 250. The emitter terminals 242 and 248 are connected in common with a conductor 252. The base terminal 188 of the first transistor is connected with the conductor 186 as mentioned above for connection with the overvoltage circuit, and the base terminal 244 of the second transistor is connected with a conductor 254 for connection with the underfrequency circuit as will be explained hereinafter.

The emitter connected conductor 252 extends to a base terminal 256 of a third amplifier means comprising a transistor 258. Said transistor has its emitter terminal 260 connected with a conductor 262 which extends to the aforementioned ground connection 132 and, the collector terminal 264 thereof is connected to a conductor 266. The conductor 266 has a coil 268 of the shutoff relay 42 connected therein and extends therefrom to the aforementioned junction 192 for connection with the direct current source conductor 28. A short branch conductor 270 connected with the conductor 266 extends to a contact 272 operatively associated with the aforementioned switch member 150 in the shutoff relay 42.

From the foregoing it will be apparent that the operation of each of the first and second transistors of the switching transistor means 246 can be controlled by the application of predetermined signal voltages to their respective base terminals. An operating signal voltage can be applied to the base terminal 188 of the first transistor by the undervoltage and starting circuit and/or overvoltage circuit as described and an operating signal voltage can be applied to the base terminal 244 of the second transistor by the underfrequency circuit as will be described hereinafter. When either of these transistors is operated or rendered conductive, current will flow through the resistor 250 and through the operative transistor and the conductor 254 to the base terminal 256 of the transistor 258 whereby to render the latter operative or conductive. When the transistor 258 is rendered operative, it completes a ground connection for the coil 268 of the shutoff relay 42 through the conductor 262 and the said coil is energized. Energization of the coil 268 causes the switch member 40, mentioned previously, to be moved to a lower position and to open the contacts 36 and 38 whereby to open the field circuit of the generator with which the protective device is associated. Also on energization of the coil 268, the switch member 150 is moved to a lower position to open the contacts 152 and 154 and to break the ground connection of the conductor 148. This results in opening of the load switches 16, 18 and 20 and de-energization of the starting relays 124 and 134 as described and in completion of the shutoff operation of the protective device.

It is also to be observed that movement of the switch member 150 to its lower position closes the contacts 152 and 272 whereby to connect the branch conductor 270 to ground at 156. This completes a holding circuit for the relay coil 268 from said ground connection through the contacts 152 and 272 and the switch member 150, through the conductors 270, 266, the junction 192, the direct current source conductor 28, and the switch 30. Thus, a lock out means is provided to prevent operation of the shutoff relay 42 subsequent to operation thereof by the switching transistor means 44. The said relay cannot be released for further operation except on opening of the aforementioned switch or switch member 30. Hence, said switch member may fairly be characterized as a reset switch as mentioned previously.

Underfrequency circuit

In the presently preferred embodiment of the invention, the underfrequency network of the protective device includes a junction 274 connected with the aforementioned secondary or branch lead conductor 22. A conductor 276 grounded at 277 and connected with the junction 274 in loop form includes a resistor-capacitor network comprising a variable resistor 278 and a capacitor 280 and a capacitor-resistor network comprising a capacitor 282 and a fixed resistor 284. A resistance bridge comprising resistors 286 and 288 has opposite sides connected with said resistor-capacitor and capacitor-resistor networks or, more specifically, a left-hand side of the bridge is connected with a junction 290 and a right-hand side thereof with a junction 292. The junction 290 is disposed in the conductor 276 between the resistor 279 and the capacitor 280 and the junction 292 is disposed in the said conductor between the capacitor 282 and the resistor 284. Rectifiers 294 and 296 are connected respectively in the left and right-hand sides of the bridge network and filtering capacitors 298 and 300 are operatively associated with said rectifiers. The rectifiers 294 and 296 are similarly oriented or arranged; that is, said rectifiers both conduct rightwardly or respectively toward and away from a junction 302 between the sides of the resistance bridge. Connected with the said junction 302 is the aforementioned conductor 214 extending to the contact 212 in the starting relay 134 and the conductor 254 extending to the base terminal 244 of the second transistor of the switching transistor means 44.

In operation of the underfrequency circuit, the junction 302 is held substantially at ground potential prior to operation of the starting relay 134. As described, the conductor 214 is connected to ground at 218 through the switch member 208 and the contacts 210 and 212 when the relay coil 158 is de-energized. When the said relay coil is energized, the switch member 208 breaks the said ground connection and the potential at the junction 302 is thereafter dependent upon the generator output frequency. The left-hand side of the bridge comprising the resistors 286 and 288 may be considered to be at a positive potential which decreases in magnitude with increasing generator output frequency. Conversely, the right-hand side of said bridge may be considered to be at a negative potential which increases in magnitude, or becomes more negative, as the generator output frequency increases. Thus, it will be seen that a predetermined positive signal voltage will appear at the junction 302 between the sides of said bridge when the generator output frequency is reduced to a predetermined minimum level. When this occurs, the presence of such predetermined signal voltage at the base terminal 244 of the second transistor in the switching transistor means 44 will cause said second transistor to become operative or conductive and a shutoff operation of the protective device will ensue. The relay 42 will be operated to effect such operation and the generator will be shutdown and the load disconnected until a resetting operation of the switch 30 has been accomplished.

Preferably a time delay device is included in the underfrequency circuit and, as shown, a time delay capacitor 303 is connected with the aforesaid bridge network between the left and right-hand sides thereof in a conductor 305 which extends to the conductor 276. Instantaneous high voltage signals at the junction 302 are shunted to ground at 277 through the capacitor 303 whereby to prevent operation of the second transistor in the switching transistor means 44. Thus, only sustained signal voltages at the aforesaid predetermined level will result in shutoff operation of the protective device.

*Alternative form*

Figure 1:
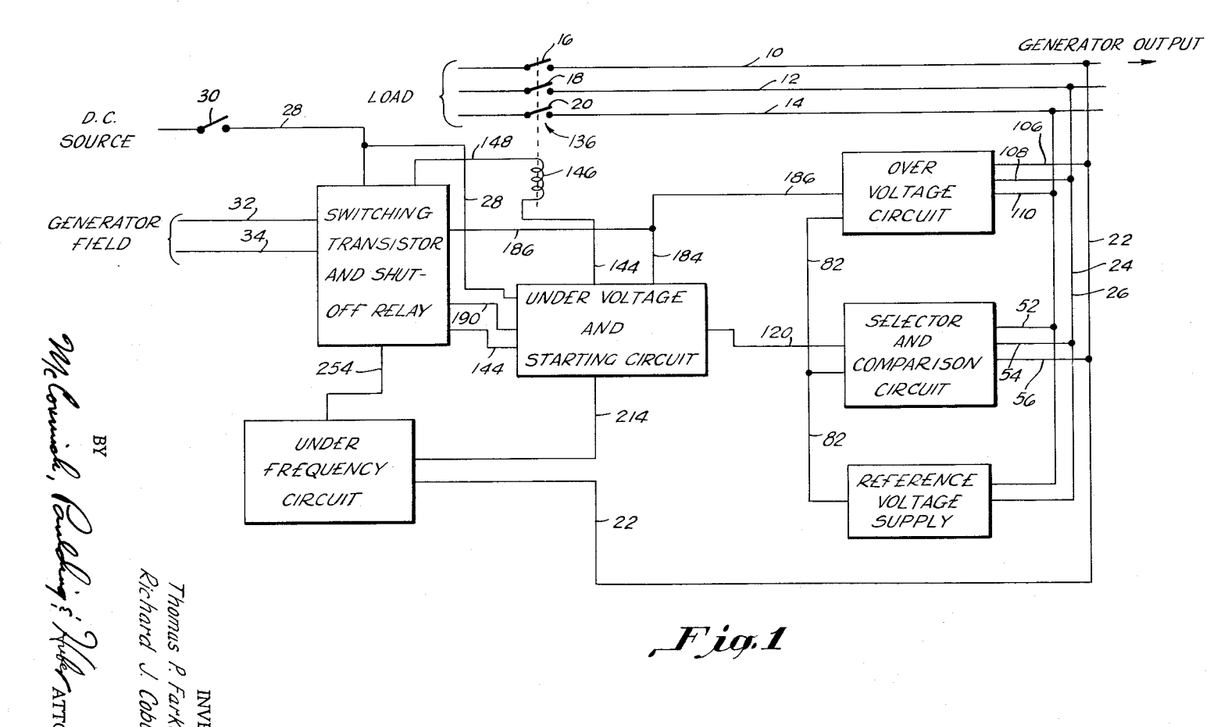
FIG. 1 is a block diagram of a generator protective device embodying the present invention.
Figure 2:
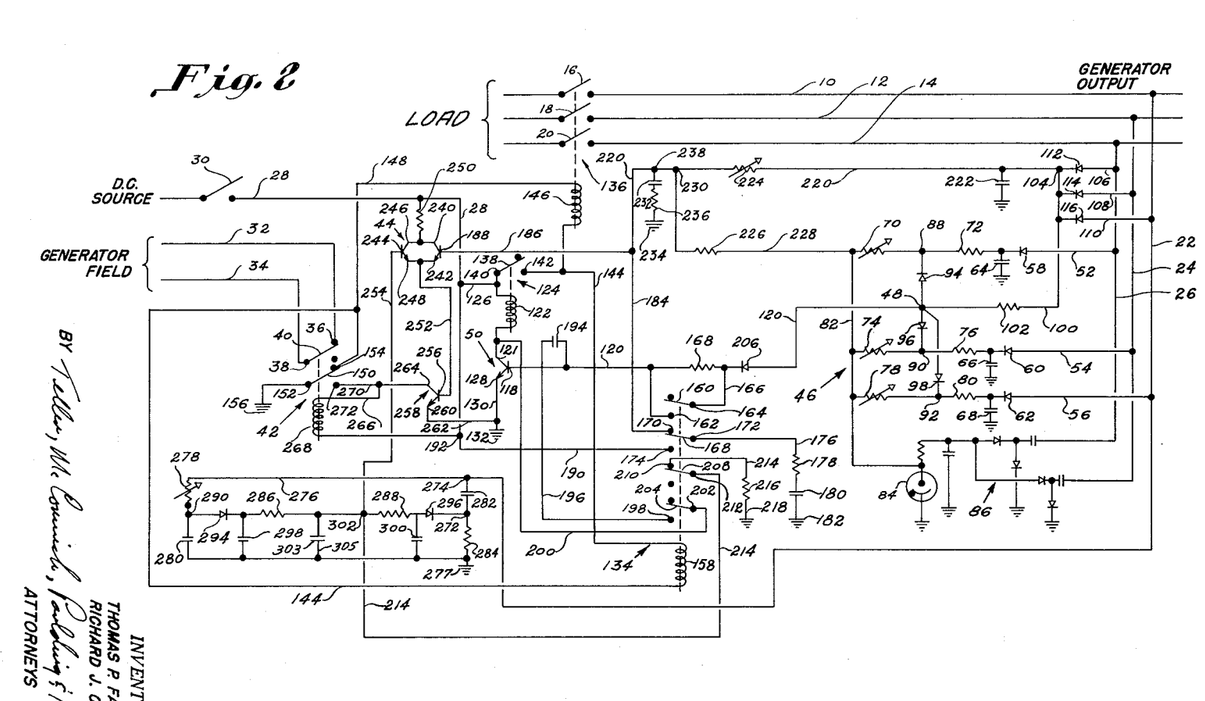
FIG. 2 is a schematic wiring diagram of a preferred form of a generator protective device.
Figure 3:
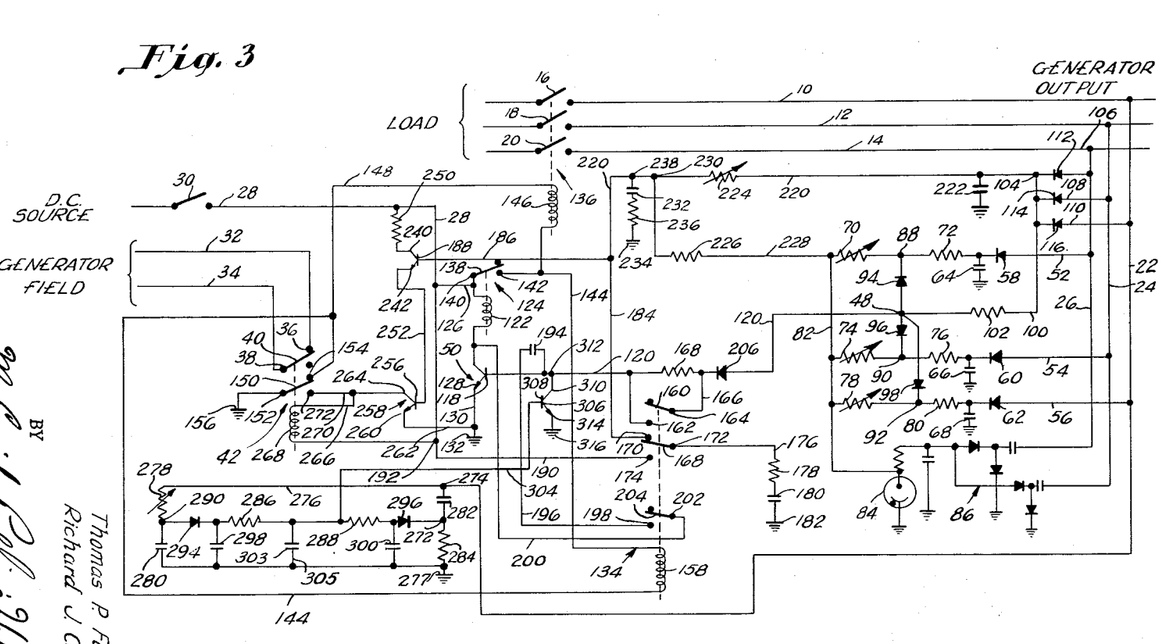
FIG. 3 is a schematic wiring diagram of an alternative form of the device.

In an alternative form of the present invention, shown in FIG. 3, the generator protective device is substantially identical with that described above in the preferred form. In the alternative form, however, the second transistor in the switching transistor means 44 is omitted, the conductors 214 and 254 are omitted, and the switch member 208 and the contacts 210 and 212 are omitted together with the resistor 216 and the ground connection 218. In addition, a conductor 304 is added to the circuit, and a transistor 306 is provided.

The conductor 304 in the alternative form of the invention is connected with the junction 302 in the underfrequency circuit and extends therefrom to a base terminal 308 of the transistor 306. The collector terminal 310 of the transistor 306 is connected to the conductor 120 in the undervoltage and starting circuit at a junction 312 and the emitter terminal 314 of said transistor is connected to ground at 316.

The operation of the alternative form of protective device is also substantially identical with that of the preferred form of protective device. There is however one important operational difference. The transistor 306 serves as a means of disabling the starting transistor 50 when the generator output frequency is below a predetermined minimum level or limit. Thus, the starting operation of the generator protective device cannot occur until the generator frequency and the generator output voltage have both reached predetermined minimum levels. When an underfrequency condition exists during starting of the generator, a predetermined signal voltage will be provided at the junction 302 in the underfrequency circuit and said voltage will be impressed on the base terminal 308 of the transistor 306. This will result in operation of the transistor 306 resulting in current flow from the conductor 120 through said transistor to ground at 316. Obviously, the starting transistor 50 will be thus disabled even though the voltage signal at the junction 48 of the selector and comparison circuit reflects a lowest lead conductor voltage in excess of the desired predetermined minimum level.

One other difference in the modes of operation of the preferred and alternative forms of the invention exists and this involves the manner in which shutoff operation of the protective device occurs subsequent to starting operation of the device. When both generator output voltage and generator output frequency have exceeded their predetermined minimum levels and a starting operation of the device has occurred through operation of the transistor 50 and the starting relays 124 and 134, an underfrequency condition may of course arise. When such condition does occur, a predetermined signal voltage at the junction 302 in the underfrequency circuit results in operation of the transistor 306. If such operation of the transistor 306 is sustained beyond the time delay period of the capacitor 194, the starting transistor 50 is rendered inoperative and the coil 158 of the primary starting relay 134 is de-energized. When this occurs, the capacitor 180 discharges to the first transistor in the switching transistor means 44 in the same manner as in the case of an undervoltage condition. This results in the provision of an operating voltage at the base 188 of said transistor and in shutoff operation of the relay 42 in the manner described above.

The invention claimed is:

1. In combination with an alternating current generator and a load, at least one lead conductor connected with the generator, a generator and/or load shutoff relay, an amplifier means connected with said relay and adapted to effect shutoff operation of the same responsive to a predetermined signal voltage, an overvoltage circuit connected with said amplifier means and with said lead conductor and operable to provide a signal voltage for operating said amplifier means when a generator output voltage exceeds a predetermined maximum level, an undervoltage and starting circuit connected with said amplifier means and with said lead conductor and operable to provide a signal voltage for operating said amplifier means when a generator output voltage first exceeds a predetermined minimum level and thereafter decreases below a predetermined minimum level, and an underfrequency circuit connected with said lead conductor and operable to provide a signal voltage for operating said amplifier means when a generator output frequency is reduced to a predetermined minimum level.

2. In combination with a polyphase alternating current generator and a load, a plurality of lead conductors connected with the generator, a generator and/or load shutoff relay, an amplifier means connected with said relay and adapted to effect shutoff operation of the same responsive to a predetermined signal voltage, an overvoltage circuit connected with said amplifier means and with at least one of said lead conductors and operable to provide a signal voltage for operating said amplifier means when a generator output voltage exceeds a predetermined maximum level, an undervoltage and starting circuit connected with said amplifier means and with at least one of said lead conductors and operable to provide a signal voltage for operating said amplifier means when a generator output voltage first exceeds a predetermined minimum level and thereafter decreases below a predetermined minimum level, and an underfrequency circuit connected with at least one of said lead conductors and connectible with said amplifier means and said undervoltage circuit and operable to provide a signal voltage for operating said amplifier means when said generator output voltage exceeds said predetermined minimum level and when generator output frequency is thereafter reduced to a predetermined minimum level.

3. In combination with a polyphase alternating current generator and a load, a plurality of lead conductors connected with the generator, a generator and/or load shutoff relay, an amplifier means connected with said relay and adapted to effect shutoff operation of the same responsive to a predetermined signal voltage, an overvoltage circuit connected with said amplifier means and with each of said lead conductors and operable to provide a signal voltage for operating said amplifier means when the highest of the lead conductor voltages exceeds a predetermined maximum level, an undervoltage and starting circuit connected with said amplifier means and with each of said lead conductors, and an underfrequency circuit connected with at least one of said lead conductors and with said undervoltage and starting circuit, said undervoltage circuit being operable to provide a signal voltage for operating said amplifier means when the generator output frequency exceeds a predetermined minimum frequency level and when the lowest of the lead conductor voltages first exceeds a first predetermined minimum level and thereafter decreases below a second predetermined minimum level, and said underfrequency circuit being operable to cause said undervoltage and starting circuit to provide a signal voltage for operating said amplifier means when said lowest lead conductor voltage exceeds said first predetermined minimum level and when the generator output frequency first exceeds and is thereafter reduced to said predetermined minimum frequency level.

4. In combination with a polyphase alternating current generator and a load, a plurality of lead conductors connected with the generator and the load, switch means in each of said conductors, a generator and/or load shutoff relay, an amplifier means connected with said relay and adapted to effect shutoff operation of the same responsive to a predetermined signal voltage, an overvoltage circuit connected with said amplifier means and with each of said lead conductors and operable to provide a signal voltage for operating said amplifier means when the highest of the lead conductor voltages exceeds a predetermined maximum level, an undervoltage and starting circuit connected with said amplifier means and with each of said lead conductors and the switch means therein and operable to close and then open said switch means and to provide a signal voltage for operating said amplifier means when the lowest of the lead conductor voltages first exceeds a first predetermined minimum level and thereafter decreases below a second predetermined minimum level, and an underfrequency circuit connected with at least one of said lead conductors and connectible with said amplifier means and said undervoltage circuit and operable to provide a signal voltage for operating said amplifier means when said lowest lead conductor voltage exceeds said first predetermined minimum level and when the generator output frequency thereafter falls short of a predetermined minimum level.

5. In combination with a polyphase alternating current generator and a load, a plurality of lead conductors connected with the generator and the load, switch means in each of said conductors, switch means in the field circuit of the generator, a shutoff relay connected with each of said switch means and adapted to open the same in a shutoff operation, selectively releasable lock out means for maintaining said relay in a shutoff condition after shutoff operation thereof has been effected, an amplifier means connected with said relay and adapted to effect shutoff operation of the same responsive to a predetermined signal voltage, an overvoltage circuit connected with said amplifier means and with each of said lead conductors and operable to provide a signal voltage for operating said amplifier means when the highest of the lead conductor voltages exceeds a predetermined maximum level, an undervoltage and starting circuit connected with said amplifier means and with each of said lead conductors and operable to provide a signal voltage for operating said amplifier means when the lowest of the lead conductor voltages first exceeds a first predetermined minimum level and thereafter decreases below a second predetermined minimum level, and an underfrequency circuit connected with at least one of said lead conductors and connectible with said amplifier means and said undervoltage circuit and operable to provide a signal voltage for operating said amplifier means when said lowest lead conductor voltage exceeds said first predetermined minimum level and when the generator output frequency is thereafter reduced to a predetermined level.

6. In combination with an alternating current generator and a load, at least one lead conductor connected with the generator, rectifying means connected with said lead conductor, means supplying a substantially constant direct current reference voltage, a selector and comparison circuit connected with said rectifying means and said reference voltage supply means and operable to provide a direct current signal voltage variable with a generator output voltage, a starting relay, a first amplifier means connected with said selector and comparison circuit and with said starting relay and adapted to operate said starting relay responsive to said signal voltage, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said generator output voltage increases above a predetermined minimum level and thereafter decreases below a predetermined minimum level.

7. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct signal voltage variable with a generator output voltage, a starting relay, a first amplifier means connected with said selector and comparison circuit and said starting relay and adapted to operate said starting relay responsive to said signal voltage, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said generator output voltage increases above a predetermined minimum level and thereafter decreases below a predetermined minimum level.

8. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct current signal voltage variable with a generator output voltage, a starting relay, a first amplifier means connected with said selector and comparison circuit and said starting relay and adapted to operate said starting relay responsive to said signal voltage, a generator and/or load shutoff relay, a second amplifier means connected with said shutoff relay and adapted to operate the same, and a capacitor connectible selectively with a direct current power source and with said second amplifier means by operation of said starting relay, said capacitor being connected with said power source by said starting relay so as to be charged thereby when said signal voltage increases above a predetermined minimum level, and said capacitor being connected with said second amplifier means by said starting relay so as to discharge and to supply an operating voltage to said second amplifier means whereby to operate said shutoff relay when said signal voltage thereafter decreases below a predetermined level.

9. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct current signal voltage variable with a generator output voltage, a starting relay, a first amplifier means connected with said selector and comparison circuit and said starting relay and adapted to operate said starting relay responsive to a signal voltage in excess of a predetermined minimum level, a time delay device connected with said first amplifier means so as to temporarily maintain operation thereof when said signal voltage exceeds said predetermined level and then decreases below said predetermined level, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said signal voltage increases above said predetermined minimum level and is thereafter sustained below a predetermined level.

10. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct current signal voltage variable with a generator output voltage, a starting relay, a first amplifier means connected with said selector and comparison circuit and said starting relay and adapted to operate said starting relay responsive to a signal voltage in excess of a predetermined minimum level, a time delay device comprising a capacitor connected with and charged by a direct current power source, said capacitor being connected also with said first amplifier means so as to discharge thereto and temporarily maintain operation thereof when said signal voltage decreases below a predetermined level, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said signal voltage increases above said predetermined minimum level and is thereafter sustained below a predetermined level.

11. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct current signal voltage variable with a generator output voltage, a starting relay, a first amplifier means connected with said selector and comparison circuit and with said starting relay and adapted to operate said starting relay responsive to a signal voltage in excess of a predetermined minimum level, a time delay device connected with said first amplifier to temporarily maintain operation thereof when said signal voltage decreases below said predetermined level, means operatively associated with said time delay device to provide a minimum time delay period which is independent of the magnitude of instantaneous signal voltage reductions, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said signal voltage increases above said predetermined minimum level and is thereafter sustained below said level.

12. In combination with a polyphase alternating current generator and a load, a plurality of lead conductors connected with the generator, means supplying a substantially constant direct current reference voltage, a selector and comparison circuit connected with said reference voltage supply means and with at least one of said lead conductors and operable to provide a direct current signal voltage variable with a generator output voltage, a starting relay, a first amplifier means connected with said selector and comparison circuit and said starting relay and adapted to operate said starting relay responsive to a signal voltage in excess of a first predetermined minimum level, means operable to provide a dead band in the operation of said first amplifier means whereby said means will not cease operation subsequent to an increase of said signal voltage above said first predetermined minimum level until said signal voltage has been reduced to a second and lower predetermined minimum level, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said signal voltage exceeds said first predetermined level and thereafter decreases to said second predetermined level.

13. In combination with a polyphase alternating current generator and a load, a plurality of lead conductors connected with the generator, a plurality of rectifying means connected respectively with said lead conductors, means supplying a substantially constant direct current reference voltage, a selector and comparison circuit connected with said rectifying means and said reference voltage supply means and having an output junction connected with a direct current power source and at which there is provided a direct current signal voltage variable with the lowest of the lead conductor voltages, said circuit also comprising a plurality of resistance bridge means connected respectively between said several rectifying means and said reference voltage supply means and a second plurality of rectifying means connected respectively between mid-points of said bridge means and said output junction so as to reduce the voltage at said junction to the level of the lowest bridge mid-point voltage, a starting relay, a first amplifier means connected with said selector and comparison circuit output junction and said starting relay and adapted to operate said starting relay responsive to said signal voltage at said output junction, a generator and/or load shutoff relay, a second amplifier means connected with said shutoff relay and adapted to operate the same, and means connected with said starting relay and said second amplifier means for supplying an operating voltage to the latter, said last-mentioned means being rendered operable by said starting relay to supply said operating voltage to said second amplifier means and to thereby operate said shutoff relay when said signal voltage increases above a predetermined minimum level and thereafter decreases below said level.

14. In combination with a polyphase alternating current generator and a load, a plurality of lead conductors connected with the generator, a plurality of rectifying means connected respectively with said lead conductors, means supplying a substantially constant direct current reference voltage, a selector and comparison circuit connected with said rectifying means and said reference voltage supply means and operable to provide a direct current signal voltage variable with the lowest of the lead conductor voltages, a starting relay, a first amplifier means connected with said selector and comparison circuit and said starting relay and adapted to operate said starting relay responsive to a signal voltage in excess of a first predetermined minimum level, means operable to provide a dead band in the operation of said first amplifier means whereby the same will not cease operation subsequent to an increase of said signal voltage above said first predetermined minimum level until said signal voltage has been reduced to a second and lower predetermined minimum level, a time delay device connected with said first amplifier means so as to temporarily maintain operation thereof when said signal voltage instantaneously decreases below said second predetermined level, a generator and/or load shutoff relay, a second amplifier means connected with said shutoff relay and adapted to operate the same, and a capacitor connectible selectively with a direct current power source and with said second amplifier means by operation of said starting relay, said capacitor being connected with said power source by said starting relay so as to be charged thereby when said signal voltage increases above said first predetermined minimum level, and said capacitor being connected with said second amplifier means by said starting relay so as to discharge and to supply an operating voltage to said second amplifier means whereby to operate said shutoff relay when said signal voltage is thereafter sustained below said second predetermined level.

15. In combination with an alternating current generator and a load, at least one lead conductor connected with the generator, means supplying a substantially constant reference voltage, a resistance bridge means connected between said reference voltage supply means and said lead conductor to provide a signal voltage variable with a generator output voltage, a direct current power source, a generator and/or load shutoff relay, and an amplifier means connected with said relay, with said power source, and with said resistance bridge means and adapted to operate said relay responsive to a signal voltage in excess of a predetermined maximum level.

16. In combination with a polyphase alternating current generator and a load, a plurality of lead conductors connected with the generator, a plurality of rectifying means connected respectively with said lead conductors and connected together so as to provide a direct current voltage proportional to the highest of the lead conductor voltages, means supplying a substantially constant direct current reference voltage, a resistance bridge means connected between said rectifying means and said reference voltage supply means to provide a direct current signal voltage variable with said highest lead conductor voltage, a direct current power source, a generator and/or load shutoff relay, and an amplifier means connected with said relay, with said direct current power source, and with said resistance bridge means and adapted to operate said relay responsive to a signal voltage in excess of a predetermined maximum level.

17. In combination with an alternating current generator and a load, at least one lead conductor connected with the generator, means supplying a substantially constant reference voltage, a resistance bridge means connected between said reference voltage supply means and said conductor to provide a signal voltage variable with a generator output voltage, time delay means comprising a capacitor connected with said resistance bridge means and operable to shunt instantaneous high signal voltages to ground, a direct current power source, a generator and/or load shutoff relay, and an amplifier means connected with said relay, with said direct current power source, with said resistance bridge means, and with said time relay means and adapted to operate said relay responsive to a sustained signal voltage in excess of a predetermined maximum level.

18. In combination with an alternating current generator and a load, at least one lead conductor connected with the generator, means supplying a substantially constant reference voltage, a resistance bridge means connected between said reference voltage supply means and said lead conductor to provide a signal voltage variable with a generator output voltage, a direct current power source, a generator and/or load shutoff relay, an amplifier means connected with said relay, with said direct current power source, and with said resistance bridge means and adapted to effect shutoff operation of said relay responsive to a signal voltage in excess of a predetermined maximum level, and releasable lock out means connected with and operated by said shutoff relay to prevent operation of said relay subsequent to shutoff operation thereof by said amplifier means.

19. In combination with an alternating current generator and a load, at least one lead conductor connected with the generator, means supplying a substantially constant reference voltage, a resistance bridge means connected between said reference voltage supply means and said lead conductor to provide a signal voltage variable with a generator output voltage, a direct current power source, a shutoff relay connected with the field circuit of the generator and operable to open the same, and an amplifier means connected with said relay, with said direct current power source, and with said resistance bridge means and adapted to operate said shutoff relay responsive to a signal voltage in excess of a predetermined maximum level.

20. In combination with a polyphase alternating current generator and a connected load, a plurality of lead conductors connected with the generator, a plurality of rectifying means connected respectively with said lead conductors and connected together so as to provide a direct current voltage proportional to the highest of the lead conductor voltages, means supplying a substantially constant direct current reference voltage, a resistance bridge means connected between said rectifying means and said reference voltage supply means to provide a direct current signal voltage variable with said highest lead conductor voltage, time delay means comprising a capacitor connected with said resistance bridge means and operable to shunt instantaneous high signal voltages to ground, a shutoff relay connected with the field circuit of the generator and operable to open said circuit, said relay also being connected with the generator and its load and being operable to disconnect the same, an amplifier means connected with said shutoff relay, with a direct current power source, with said resistance bridge means, and with said time delay means and adapted to operate said relay responsive to a sustained signal voltage in excess of a predetermined maximum level, and releasable lock out means connected with and operated by said shutoff relay to prevent operation of said relay subsequent to shutoff operation thereof by said amplifier means.

21. In combination with an alternating current generator and a load, at least one lead conductor connected with the generator, a generator and/or load shutoff relay, capacitor-resistor and resistor-capacitor networks connected in parallel with said generator lead conductor, a resistance bridge with opposite sides connected respectively with said capacitor-resistor network between said capacitor and resistor and with said resistor-capacitor network between said resistor and capacitor, first and second similarly oriented rectifying means arranged in opposite sides of said resistance bridge so as to provide a predetermined signal voltage between the sides of said bridge responsive to generator output frequency below a predetermined level, and means connected with said shutoff relay and with said resistance bridge between the sides thereof and operable responsive to said predetermined signal voltage to operate said shutoff relay.

22. In combination with an alternating current generator and a load, at least one lead conductor connected with the generator, a generator and/or load shutoff relay, capacitor-resistor and resistor-capacitor networks connected in parallel with said generator lead conductor, a resistance bridge with opposite sides connected respectively with said capacitor-resistor network between said capacitor and resistor and with said resistor-capacitor network between said resistor and capacitor, first and second similarly oriented rectifying means arranged in opposite sides of said resistance bridge so as to provide a signal voltage at a predetermined level responsive to generator output frequency below a predetermined minimum level, an amplifier means connected with said relay and with said resistance bridge between the sides thereof to operate said relay responsive to signal voltages at said predetermined level, and a time delay capacitor connected between said resistance bridge and ground to shunt instantaneous high signal voltages to ground and to thereby provide for operation of said shutoff relay only in response to sustained signal voltages at said predetermined level.

23. In combination with an alternating current generator and a load, at least one lead conductor connected with the generator, means supplying a substantially constant reference voltage, a selector and comparison circuit connected with said reference voltage supply means and with said lead conductor and operable to provide a first direct current signal voltage variable with a generator output voltage, a starting relay, a first amplifier means connected with said selector and comparison circuit and said starting relay and adapted to operate said starting relay responsive to said first signal voltage, a frequency responsive network connected with said generator lead conductor and operable to provide a second signal voltage responsive to generator output frequency below a predetermined minimum level, means connected with said frequency responsive network and said first amplifier means and operable to disable said first amplifier means for operating said starting relay responsive to said second signal voltage, a generator and/or load shutoff relay, a second amplifier means connected with said shutoff relay and adapted to operate the same, and means connected with said starting relay and connectible with said second amplifier means for supplying an operating voltage to the latter, said last-mentioned means being connected with said second amplifier means to supply said operating voltage thereto and being disconnected therefrom by operation of said starting relay.

24. The combination as set forth in claim 23 wherein said disabling means connected with said frequency responsive network and said first amplifier means comprises a third amplifier means connected to ground and operable responsive to said second signal voltage to reduce said first signal voltage below said predetermined minimum level.

25. The combination as set forth in claim 24 and including a time delay device operable to temporarily maintain operation of said first amplifier means when said first signal voltage is reduced below said predetermined minimum level.

26. In combination with an alternating current generator and a load, at least one lead conductor connected with the generator, a generator and/or load shutoff relay, an amplifier means connected with said relay and adapted to effect shutoff operation of the same responsive to a predetermined signal voltage, and an undervoltage and starting circuit connected with said amplifier means and with said lead conductor and operable to provide a signal voltage for operating said amplifier means when a generator output voltage first exceeds a predetermined minimum level and thereafter decreases below a predetermined minimum level.

References Cited by the Examiner
UNITED STATES PATENTS

| | | | |
|---|---|---|---|
| 2,883,561 | 4/1959 | Reeder | 307—87 |
| 2,885,568 | 5/1959 | Reeder | 317—13 |
| 2,959,717 | 11/1960 | Conger | 317—148.5 |

SAMUEL BERNSTEIN, *Primary Examiner.*